United States Patent

Lester

[15] 3,696,384

[45] Oct. 3, 1972

[54] ULTRASONIC TRACKING AND LOCATING SYSTEM

[72] Inventor: Robert W. Lester, Manhasset, N.Y.

[73] Assignee: Recognition Devices, Inc., New York, N.Y.

[22] Filed: July 8, 1971

[21] Appl. No.: 160,851

[52] U.S. Cl.................340/312, 340/16, 340/152 T
[51] Int. Cl..............................G01s 3/80, G08b 5/00
[58] Field of Search....340/311, 312, 152 T, 258, 16, 340/171; 343/6.5; 181/0.5 AG, 0.5 T, 0.5 ED, 0.5 SH, 0.5 J

[56] References Cited

UNITED STATES PATENTS

| | | | |
|---|---|---|---|
| 3,270,338 | 8/1966 | Watters | 343/6.5 SS |
| 3,439,320 | 4/1969 | Ward | 340/312 X |
| 3,624,608 | 11/1971 | Altman | 340/152 |

Primary Examiner—Donald J. Yusko
Attorney—Allison C. Collard

[57] ABSTRACT

An ultrasonic tracking and locating system in which an identification code number is programmed on a console keyboard to activate an encoder which transmits a plurality of coded pulses to a plurality of transceiver units located in the rooms of a building where surveillance is desired. A transducer in the transceiver transmits a coded, ultrasonic digital signal which is dispersed throughout the room. Portable pocket unit transceivers carried by persons to be located receive the transmitted ultrasonic signals and decode the signals to determine if they correspond to the pocket unit's identification code. If the signal corresponds to the pre-programmed code, the pocket unit transmits a single ultrasonic pulse which is received by the room transceiver and is transmitted back to the console, where a display converter activates a digital readout display to provide a visual, numerical indication of the location of the person.

21 Claims, 10 Drawing Figures

INVENTOR.
ROBERT W. LESTER

ATTORNEY.

INVENTOR.
ROBERT W. LESTER

BY

ATTORNEY.

ULTRASONIC TRACKING AND LOCATING SYSTEM

The present invention relates to electronic locating systems, and in particular, to an ultrasonic tracking and locating system for determining the position of persons or objects.

Prior art electronic locating systems have generally used RF transmitters to transmit a signal of a given frequency which is received by a tuned portable receiver carried by a person to be located. The receiver then audibly or visually indicates to the person that he is being paged, whereupon the person must proceed to the nearest telephone and dial a central operator or switching system which will connect him with his incoming call or the party paging him. In any case, cooperation of the party to be located is required. The disadvantages of a visual indication system are obvious: inattention or distraction of the person paged prevents the person from being located promptly. The audible indication system in which a loud beep is emitted by the receiver being worn is disadvantageous since no dignity is provided the person paged. Such devices are completely inappropriate in such areas as hospital operating rooms, where a sudden beep during the middle of an operation could distract operating room personnel.

Furthermore, radio frequency transmission devices require an FCC license for the operation thereof, as well as expensive transmitters, antennae, and bulky receivers that must be carried by the person to be located. Dead spots also often occur as a result of radio shielding of certain areas.

Accordingly, the present invention provides an ultrasonic tracking and locating system including a console having a keyboard and a code generator for programming a person's identification code and generating a series of digital pulses which are transmitted to a plurality of room transceivers located in the rooms of a building complex where surveillance is desired. Each of the room transceivers generate an ultrasonic digital signal in response to the generated programmed signal and transmits it throughout the room in which the transceiver is located. Since ultrasonic sound waves do not readily penetrate physical barriers, such as walls separating adjoining rooms, the room transceivers will only pick up ultrasonic sound waves from the room in which it is located, and will not receive ultrasonic signals transmitted by pocket units in adjoining rooms. Overlap is thereby prevented. The ultrasonic signals are received by portable pocket unit transceivers carried by the persons subscribing to the system who are located in the rooms having an ultrasonic transceiver disposed therein. The person's pocket unit transceiver receives the ultrasonic signals and decodes them to determine if it corresponds to the identification code of the person carrying the pocket unit. If it does not correspond, a transmitter included in the pocket unit remains inactivated. However, if the code does correspond, a single ultrasonic pulse is generated by the pocket unit which is received by the room transceiver. The room transceiver then generates a single electrical pulse which is transmitted back to the console to a display coder. A digital display device is thereby activated to indicate the location of the person whose pocket unit transceiver is responding to the generated signals.

The determination of the location of a particular person or object is accomplished by a console operator who programs the person's code into a keyboard and waits for the response of the digital display indicating the person's location. However, automatic switching means may be provided instead so that the position of a person having an incoming telephone call may be automatically determined and a telephone near the person sent a ringing signal A cyclical scanning apparatus may also be provided for cyclically scanning the rooms of the building to determine the position of the persons carrying the portable pocket units and identifying their location on a display board. Such a system provides constant indication of the location of the persons, and enables the console operator, or the automatic switching system, to immediately determine the position of the person desired. The coded digital pulses to the room transceivers may be transmitted either through conventional telephone lines or through existing electrical wires that supply ordinary 60 cycle 115 volt currents.

In another embodiment of the invention, the portable pocket unit transceiver can be designed to flash a light, vibrate subsonically against the person's body or provide other means of indication rather than transmitting an ultrasonic signal back to the room transceiver. A further modification of this embodiment may include a remote transceiver mounted within the room, such as in a lamp, which would provide an audible sound or flashing light in a manner similar to the pocket transceiver so as to serve as a paging system for persons located in the room.

It is therefore an object of the present invention to provide an ultrasonic tracking and locating system which does not require an FCC license, a transmitter, or an antenna for operation.

It is another object according to the present invention to provide an ultrasonic tracking and locating system having components which are substantially reduced in size and weight.

It is a further object according to the present invention to provide an ultrasonic tracking and locating system which will locate the position of a person without requiring his cooperation or informing him that he is being paged.

It is also an object of the present invention to provide an ultrasonic locating and tracking system which is simple in design, easy to manufacture, and efficient and reliable in operation.

Other objects and features of the present invention will become apparent from the following detailed description considered in connection with the accompanying drawings which disclose several embodiments of the present invention. It is to be understood, however, that the drawings are designed for the purpose of illustration only, and not as a definition of the limits or scope of the invention.

In the drawings, wherein similar reference characters denote similar elements throughout the several views.

Figure 1:
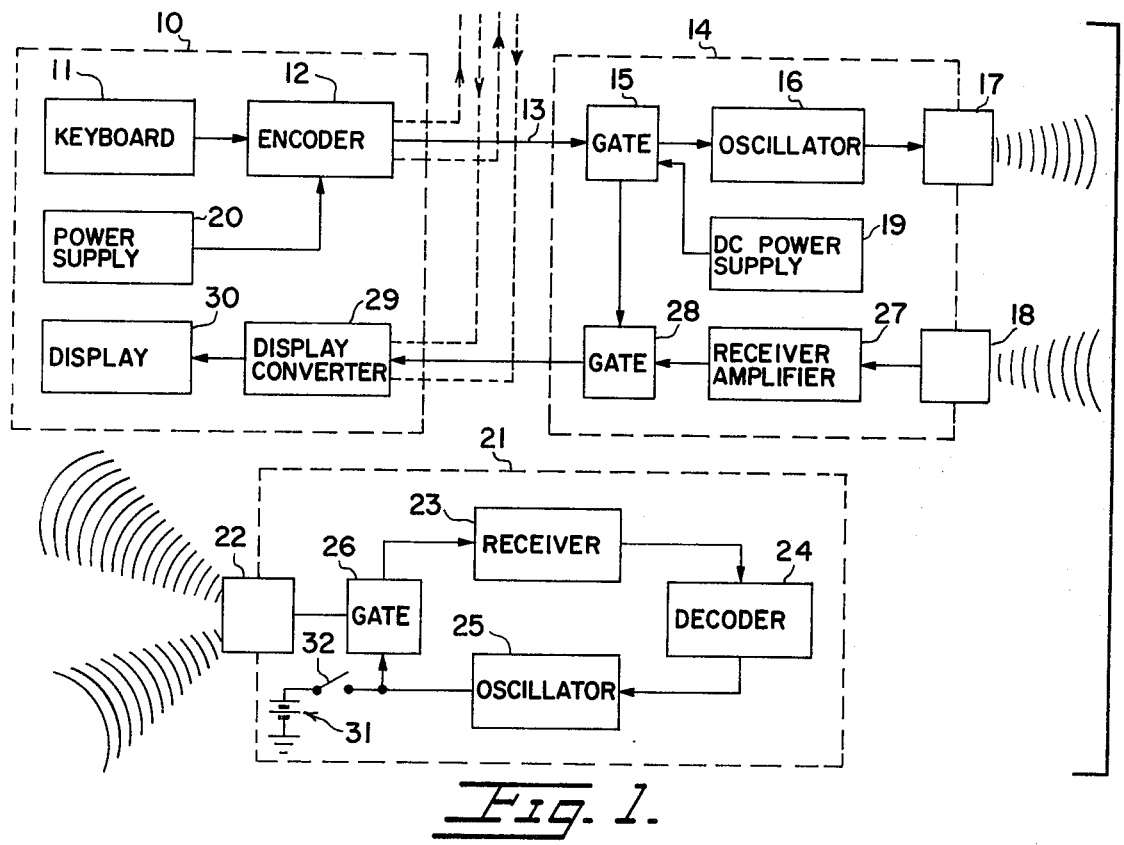
FIG. 1 is a block diagram of an ultrasonic locating and tracking system in accordance with the present invention.

Referring to the drawings, there is shown a central console 10 which includes a keyboard 11 upon which the identification number of a person to be located may be programmed. The numbers punched into the keyboard are transmitted to an encoder 12, which generates a coded sequence of pulses and transmits them over wires 13 to a plurality of room transceivers 14 selectively located in the room or hallways throughout a building. The pulses are transmitted to a gate 15 which activates an oscillator 16 and a transmit transducer 17. The transducer transmits a coded, ultrasonic signal, corresponding to the sequence of pulses generated by encoder 12, throughout the rooms and hallways in which the transceivers are located. The sequence of ultrasonic pulses represents the identification code of the person to be located. Transceiver 14 is normally biased in a "receive" or "listening" mode, so that external, ultrasonic signals may be detected by a receive transducer 18. When encoder 12 generates the coded sequence of pulses, transceiver 14 is switched into a "transmit" mode until the transmission of the ultrasonic signal is completed, whereupon it returns to the " listen" mode. The power supply for transceiver 14 and for console 10 is provided by DC supply power 19 and power supply 20 respectively.

Portable pocket unit transceivers 21 are carried by the persons subscribing to the system, and are sensitive to the ultrasonic signals transmitted by the room transceivers. Transducer 22 receives the transmitted signals from transducer 17, and transmits them to a receiver 23 and a decoder 24 which is preset to respond to a predetermined identification code and thereby identify the person carrying the pocket unit. If the signals received by transceiver 21 do not correspond to the identification code preset in decoder 24, further processing of the received signals is blocked. If, however, the received signal corresponds to the person's identification code, then, upon the cessation of the signal transmitted from the room transceiver, an oscillator 25 is activated so as to generate a single ultrasonic pulse signal through gate 26, which may be, for example, a relay, and transducer 22, into the room in which the person is located. The transmitted signal is preferably inaudible.

Transducer 18, which is located in the same room as the person to be located, detects the pulse generated by transceiver 21 and activates amplifier 27. A single electrical pulse corresponding to the generated ultrasonic pulse is then transmitted through gate 28 back to display converter 29 in console 10. Digital display 30 is thereby activated to display the room number in which the pocket unit and the person is located. No coding of the return pulse signal is necessary, since the identity of wires 13 carrying the signal gives the room location immediately.

Pocket unit transceiver 21 is powered by a battery 31 which is coupled to the components of the transceiver by a switch 32. The switch is preferably a time-delay mercury switch which is not manually operated so that the person carrying the unit is prevented from turning it off. The mercury switch is mounted on the pocket unit so that is disconnects battery 31 from the components when transceiver 21 is not vertically disposed, as it would be when carried in the person's pocket. This is accomplished by containing the mercury within a chamber in contact with both switch terminals, and providing two small diameter apertures therein to permit the mercury to flow into a compartment adjacent the chamber when the pocket unit assumes a position other than vertical. The apertures should preferably be small in size, so that several seconds are required before enough mercury flows out of the chamber to break contact with the switch terminals and disconnect the battery. Thus, a short-duration, horizontal position of the pocket unit will not interrupt its continuous operation. Such situations might occur, for example, when a person bends over to tie his shoe, or pick something off the floor. However, when the unit is not in use, and resting on a table or shelf, the battery will be automatically disconnected. This prevents long-term battery drain, and increases the useful operational life of the battery.

It should be noted that FIG. 1 illustrates the operation of only one room transceiver, pocket unit transceiver and console. However, in actual operation, a plurality of room transceivers and pocket units are used, and are activated simultaneously by console unit 10.

Figure 2:
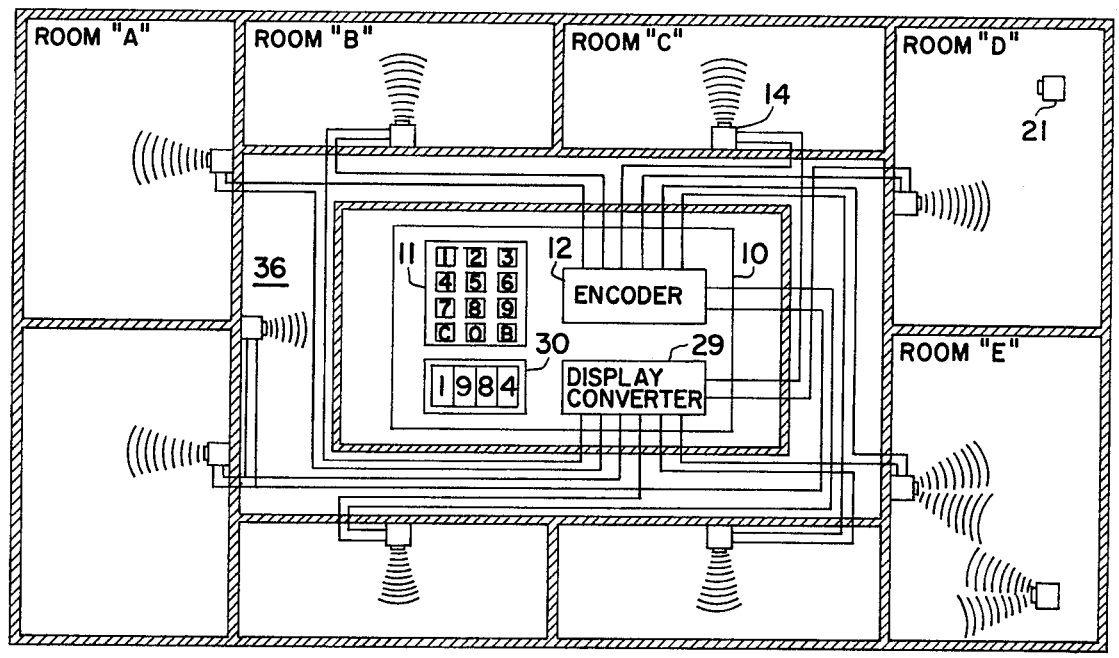
FIG. 2 is a schematic diagram of the ultrasonic locating and tracking system of the present invention showing the room and pocket unit transceivers located in adjacent rooms, and the central control console for transmitting and receiving the coded digital pulses, which enable the location of the person to be determined.

FIG. 2 illustrates console 10 in greater detail and shows its connection to a plurality of room transceivers 14 disposed in the rooms and hallways of a building. The connection between the room transceivers and the console may be accomplished by an interface connector of any suitable type. Surveillance of hallways, such as hallway 36, is accomplished by tapping the wires of the closest room transceiver near the hallway location where coverage is desired. Keyboard 11 contains 10 numerical digits, each on a single key, a "clear" or "reset" key for clearing the keyboard of the identification number programmed therein if a mistake has been made, and a "send" or "transmit" key for transmitting the identification code to encoder 12. After the number is programmed on the keyboard, digital display 30 will display the identification number programmed and enable the operator to determine immediately if a mistake has been made. If the correct number has been entered, the "send" key is pushed and the identification number is transmitted to encoder 12.

FIG. 2 shows each of the room transceivers 14 transmitting the ultrasonic digital pulses transmitted by encoder 12. In rooms D and E, pocket unit transceivers 21 receive the ultrasonic signals transmitted by the room transceiver located therein. In room E, the pocket unit transceiver has received the ultrasonic signal transmitted by the room transceiver, decoded the signal and determined that it corresponds to the identification code of the pocket unit, and transmitted a digital pulse which is received by the room transceiver and relayed back to display converter 29 to provide numerical room location on data display 30. In room D, however, no signal is transmitted by transceiver 21 in response to the ultrasonic signal transmitted by the room transceiver. In this case, the pocket unit decoder has determined that the code transmitted does not correspond to the identification code of the pocket unit, and the same response is obtained as if no pocket unit transceiver were located in the room.

Transducers 17, 18 and 22 may be any conventional device, such as a pizeoelectric crystal, which is capable of generating an ultrasonic signal when actuated electrically by, for example, an oscillator. These ultrasonic transducers are also omni-directional, i.e., they are sensitive to signals arriving from all directions or from a wide range of directions. This omni-directional characteristic prevents "dead" spots or inactive regions in a room.

Since ultrasonic reflections bouncing off the walls of a room could cause interference with the digital decoding process carried on by decoder 24, a timer is provided in the decoder to delay any reflections present in the room from proceeding to the next step in the code sequence. Encoder 12 is also time sequenced to allow for the decoder timing and prevent false triggering. A room in which acoustic absorption is good presents the greatest problem. In such a case, the time factor should preferably allow for a diminishing of the signal in the interval to one-tenth of a second "on" and one-fifth of a second "off."

Interference may also be achieved by providing phase reversal of a continuous signal. The phase change at 30 khz would be a phase change of one-tenth of a second. This method is similar to Loran of the frequency shift type, and each signal burst from the console is a different frequency and each room transceiver changes its frequency in response to encoder 12. Every other frequency may therefore be received at a different time interval, or a series of frequencies may be received, in sequence, without time delays provided therebetween, since the ultrasonic room reflections have no effect on the different frequencies. In contrast, conventional RF decoding may be interfered with by stray signals outside the system.

Figure 10:
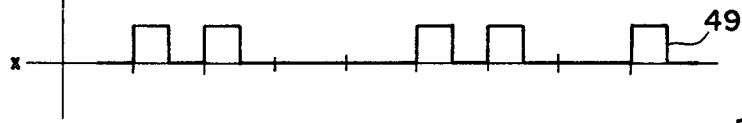
FIG. 10 is a graphical illustration of a typical digital coded interrogation signal transmitted by the console and room transceivers of the present invention.

FIG. 10 illustrates a typical coded interrogation signal 49 which is transmitted by encoder 12 and room transceiver 14 to the pocket unit transceivers. The amount of time required for transmission of this binary coded signal will depend on the capacity of the system designed. An initiating pulse, which activates the pocket units so that they are set to begin receiving the ultrasonic pulses, is also transmitted by the room transceivers before the coded sequence of pulses is sent out.

Figure 3:
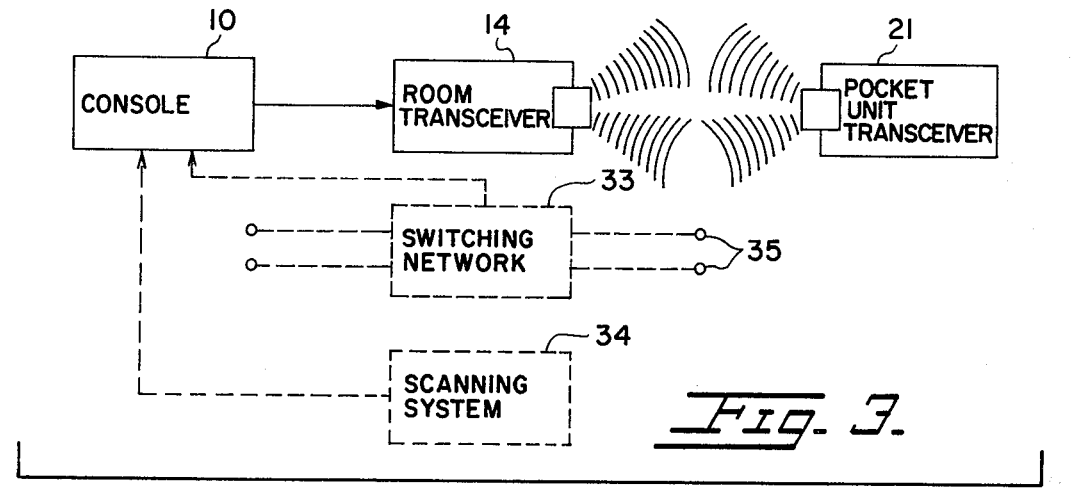
FIG. 3 is a block diagram of the system of FIG. 1 showing means for cyclically scanning the locations of a number of people carrying portable pocket units, and means for determining the position of a person to be located and automatically connecting an incoming telephone call to a telephone extension located near the person wanted.

As shown in FIG. 3, the system of FIG. 1 may also be provided with either a scanning system 34, which locates persons on the premises rapidly by sequentially scanning the premises in cycles, or a telephone switching network 33 which automatically connects a person at the extension telephone 35 to a telephone located near the person desired to be located. Detailed descriptions of the design and operation of the above-described switching network and scanning system are set forth fully in the applicant's copending application filed May 24, 1971, entitled "An Electronic System for Locating."

The wires connecting console 10 to room transceivers 14 may be, for example, spare telephone wires located in the building. These wires may be intercepted at a terminal board, or at a connector of the telephone in the room near the desk of the person. The room transceiver may be mounted on the wall near the terminal board or connector, as desired. The transceiver may also be located within the telephone itself; however, the transducer should be exposed to the atmosphere, for example, either at the rear of the telephone or on the front upper surface of the phone casing. The location of the transceiver or transducer, however, is completely arbitrary. For example, the transducer, the room transceiver, or both, may be located in lighting fixtures, built into the wall, ceiling, etc.

The connecting wires may also be the existing network of wire pairs supplying ordinary 115 volt, 60 Hz house current in the building where the system is installed. A system similar to that disclosed in the above-described co-pending application of the applicant may be used. In such a system, a carrier current transmitter (not shown) is provided in console 10 to transmit the digital signals over the building wiring. The room transceiver would then plug into the wall outlet receptacles of each room in order to receive the signals generated by the console. The remaining components of the system would be the same as those described with respect to the previous embodiments.

There are several ways of locating a person and transmitting his location to another person who desires to contact him. If, for example, there is an incoming telephone call, an operator at a switchboard may program the person's identification number onto keyboard 11 and await the indication of the person's location on digital display 30. The operator may then inform the person desiring the information of the location of the person and the nearest telephone extension so that he may contact the party. The operator may also dial the particular location herself, and connect the telephone call directly.

The digital display may be eliminated and a flashing light substituted adjacent the telephone extension key on the switchboard console. The operator may then directly connect the incoming telephone call to the extension and ring the party.

A listing board containing all the room numbers of a building may also be provided, and a light emitting diode disposed next to each room number which will light up to indicate the location of the person. In any of the previous embodiments, the previously described scanning system may be used to store the personnel location data and reduce the time required to locate the party. With such a system, the operator would immediately know if the person is available to accept a call, or if he is out of the building.

In order to eliminate the need for a switchboard operator and also eliminate the display apparatus, the locating system may be designed so that a calling person may first dial an access code which will connect him to the console, and subsequently, dial the identification number of the person to be located, and be automatically connected with the party by the automatic switching apparatus. In such a system, the dialing of the person's identification code number causes the console to generate a plurality of interrogating signals which search for the person to be located. If a response signal is returned from the person's pocket unit transceiver, the switching apparatus automatically connects the incoming telephone call to the extension nearest the person wanted. In such a system, the console first searches for the person, even when he is located in his own office, and then connects the call to an extension nearest the person so that he may take the call or message. The switchboard operator is thus not needed.

The present system utilizes an inaudible signal transmitted from the pocket unit transceiver to indicate the person's location. However, as in some prior art systems, the pocket unit may be designed to respond with an audible signal (beep), visual signal (flashing light), or vibrations, to alert the person that he is being paged. The present invention thus has all the advantages of currently available radio paging systems, without requiring powerful radial transmitters, antennae, FCC licenses, leased telephone lines, etc., for operation. The system of the present invention may be used for paging, and for instantaneous location of a person in situations where the person cannot conveniently reply to the paging call at the instant it is received. The cost of the system as a standard pager with an audible beep is also considerably less costly than an equivalent radio coded type.

Figure 4:
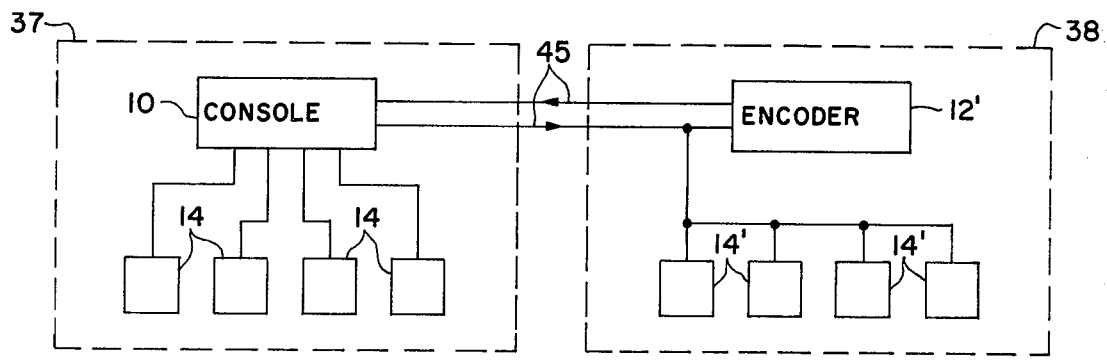
FIGS. 4, 5, 6 and 7 are block diagrams of modified embodiments of the ultrasonic tracking and locating system illustrated in FIG. 1.

FIG. 4 illustrates an ultrasonic locating and tracking system for surveillance of a plurality of plants or remote buildings in other cities or distant locations from a local location. Console 10 is located in local building 37 and is coupled to remote building 38 by a two-wire telephone line 45. In building 38, the coded series of pulses transmitted by console 10 to room transceivers 14 is also transmitted over wire 45 to remote room transceivers 14' in remote building 38. Both of the systems in each building are the same as those previously described with respect to FIG. 1. If a signal is transmitted by a pocket unit transceiver in response to the coded signal, remote encoder 12' converts the single pulse response to a digital serial pulse train which is transmitted back to console 10 over wire 45 to activate display 30 and thereby indicate the location of the person.

Figure 5:
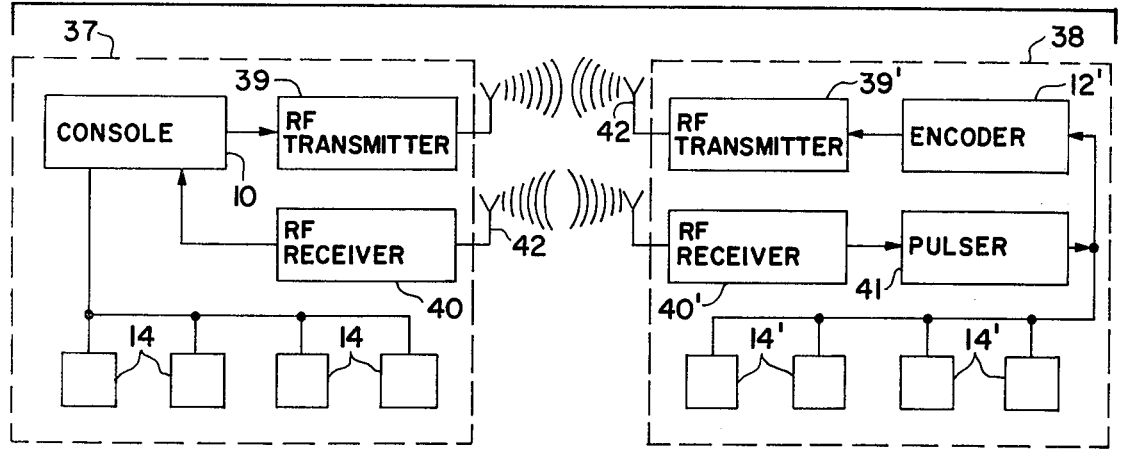

In situations where it is impractical, or impossible, to link the remote building to the local building by telephone wires, the system may be modified as illustrated in FIG. 5. RF transmitter 39 is coupled to console 10 and transmits the coded signal from console 10 to remote building 38 by means of antenna 42. A corresponding antenna at the remote building receives the signal and transmits it to an RF receiver 40'. Pulser 41 then relays the interrogation signal to remote room transceivers 14'. If a response from a pocket unit transceiver is received by the room transceivers, the pulse is transmitted to encoder 12' which converts it to a digital serial pulse train and transmits it to RF transmitter 39' for transmission back to console 10 in building 37 by means of antennae 42. RF receiver 40 in building 37 receives the transmitted signals and transmits them to console 10 where a visual display of the location of the person appears.

Figure 6:
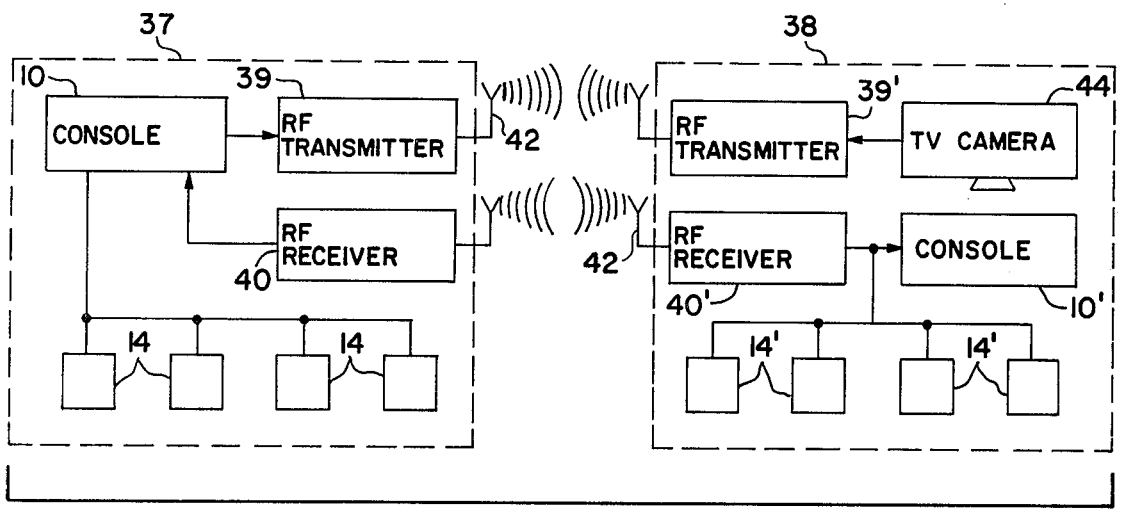

In FIG. 6, the ultrasonic locating system of FIG. 5 in remote building 38 has been modified to include remote console 10' similar to console 10 located in building 37, and TV camera 44 for transmitting the visual display on console 10' of the location of the person in remote building 38 to RF transmitter 39'. The TV camera signals are transmitted by antennae 42 back to building 37 to receiver 40. Console 10 in the main building then displays the remote location of the person desired.

Figure 7:
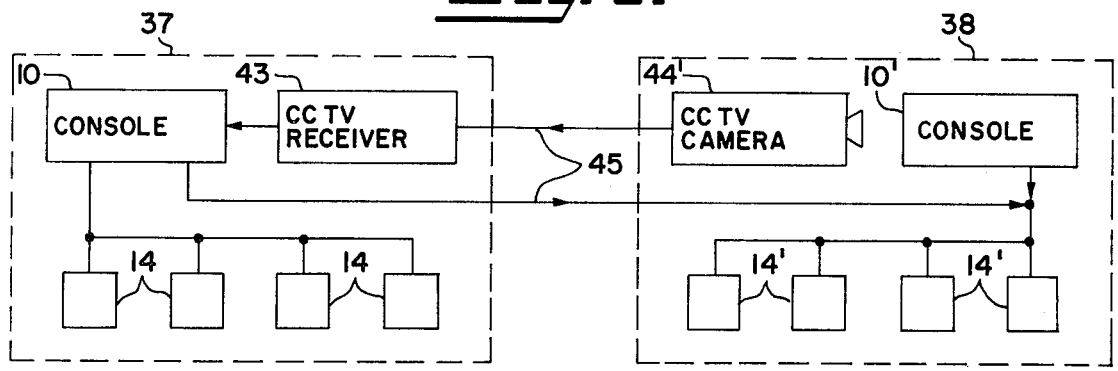

In FIG. 7, the embodiment of FIG. 4 has been modified to replace encoder 12' with a remote console 10' similar to console 10 in building 37, and a closed circuit TV camera 44' which reads the digital readout on console 10' and transmits the picture back via telephone wires 45 to a closed circuit TV receiver 43 located in local building 37. Receiver 43 then transmits the signals to console 10 where the person's remote location is displayed.

Figure 8:
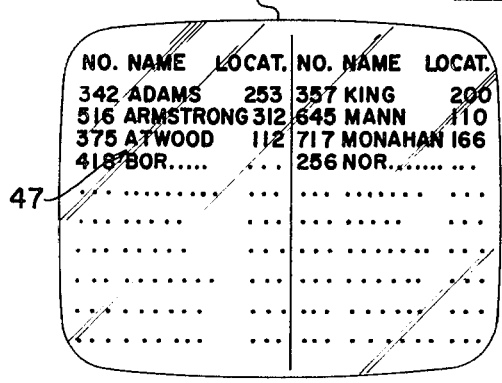
FIGS. 8 and 9 are front views of CRT display devices used to display the location of the persons subscribing to the locating system of the present invention.
Figure 9:
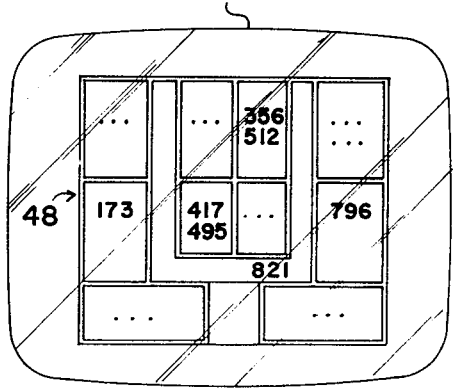

In FIGS. 8 and 9, CRT display systems for displaying the location and tracking information desired are shown. CRT tube 46 displays the pocket unit number, name and location 48 of the person desired to be located. The tube is used in conjunction with a miniature computer, which controls the data display at the console, and an alpha-numeric keyboard for adding and deleting names and numbers in the system. This system may be operated manually as described with respect to the previous embodiments, or may display data gathered by a fully, or partially, automatic scanning system. CRT tube 46' may also display a building layout 48. The person's number appears within the boundaries of the room in which he is located as shown in FIG. 9. As the person moves from one room to another, or from one room into a hallway, his number follows him on the screen. This system is preferably used with an automatic scanning system to keep the location information constantly current.

Besides the previously mentioned advantages, the present invention possess a distinct advantage over conventional paging systems of any kind: time saving. This time saving results from eliminating unconscious delay which occurs when a person is paged and is interrupted before he can respond, or is preoccupied with a telephone call or personal meeting, and reducing the time the person calling waits on the telephone line for someone to locate the party desired, especially if the calls are outside calls and are long distance.

While only several embodiments of the present invention have been shown and described, it will be obvious to those persons skilled in the art that many changes and modifications may be made thereunto without departing from the spirit and scope of the invention.

What is claimed is:

1. An ultrasonic tracking and locating system, comprising;
   means for generating a coded sequence of digital pulses, the combination of said pulses being identified with a particular object or person to be located, first transceiver means coupled to said generating means and responsive to said digital pulses, for generating a plurality of corresponding, digitally coded ultrasonic signals, second transceiver means for receiving said digital ultrasonic signals, including a digital signal decoder, tuned to a predetermined digital code, for decoding said ultrasonic signals, and transmission means responsive to said digital decoder, for transmitting at least one ultrasonic pulse in response to the reception of the ultrasonic signal whose coded sequence corresponds to the code to which said decoder is tuned, said first transceiver means receiving said ultrasonic pulse and generating a corresponding digital pulse for identifying the location of said first transceiver, and means responsive to said digital pulse for indicating the location of the person or object desired.

2. The ultrasonic tracking and locating system as recited in claim 1, wherein said generating means comprises;

a keyboard having a plurality of manually activated keys, each representing a selected numerical digit for enabling the identification code of a particular person or object to be entered therein, and a digital encoder coupled to said keyboard for generating a coded sequence of pulses representing the person's or object's identification number.

3. The ultrasonic tracking and locating system as recited in claim 1, wherein said first transceiver means comprises;

a first transducer for generating said digitally coded ultrasonic signals in response to said sequence of coded pulses generated by said generating means, an oscillator coupled to said first transducer and responsive to said generating means, so that said first transducer generates said plurality of ultrasonic digital signals, a second transducer for receiving said ultrasonic pulse transmitted by said second transceiver means, and means coupled to said second transducer for receiving and amplifying said ultrasonic pulse and transmitting said corresponding digital pulse to said indicating means.

4. The ultrasonic tracking and locating system as recited in claim 3, wherein said first and second transducers are piezoelectric crystals.

5. The ultrasonic tracking and locating system as recited in claim 1, wherein said second transceiver means comprises;

a transducer for receiving and transmitting ultrasonic signals;

means for receiving and amplifying said digitally coded ultrasonic signals generated by said first transceiver means;

a digital decoder coupled to said receiving and amplifying means for generating an output signal in response to a received ultrasonic signal having a sequence of pulses corresponding to said predetermined digital code, and an oscillator coupled to said transducer so that said transducer transmits at least one ultrasonic pulse in response to the reception of a signal corresponding to said predetermined code.

6. The ultrasonic tracking and locating system as recited in claim 5, wherein said second transceiver means further comprises a battery for supplying DC power to said receiving means, a decoder coupled to said receiving means, an oscillator coupled to said decoder and transducer, and a time delay, mercury switch, coupled to said battery and said receiving means, having an attitude sensor for sensing the vertical and horizontal position of said second transceiver means and automatically disconnecting said battery from said receiving means when said transceiver is disposed in a horizontal position and connecting said battery to said receiving means when said transceiver is disposed in a vertical position.

7. The ultrasonic tracking and locating system as recited in claim 6, wherein said transducer is a piezoelectric crystal.

8. The ultrasonic tracking and locating system as recited in claim 1, wherein said indicating means comprises;

means for converting said digital pulse generated by said first transceiver means to an electrical signal identifying the location of said generating first transceiver means, and a digital readout, having a plurality of numerical digits disposed therein for numerically indicating the location of said generating first transceiver means, said second transceiver means, and the person or object to be located.

9. The ultrasonic tracking and locating system as recited in claim 1, wherein said indicating means comprises;

means for converting said digital pulse generated by said first transceiver means to an electrical signal identifying the location of said generating first transceiver means, information storage means for storing the identification code number and name of the persons or objects to be located, and CRT display means coupled to said information storage means and said conversion means for displaying the numerical location of said generating first transceiver means, said second transceiver means transmitting said ultrasonic pulse, and the person or object to be located.

10. The ultrasonic tracking and locating system as recited in claim 9, wherein said CRT display means displays the identification number, name and location of the person or object to be located.

11. The ultrasonic tracking and locating system as recited in claim 9, wherein said CRT display means displays the floor plan of a selected location in a building, and the identification numbers of the persons or objects to be located, said numbers being disposed on said display means in a position corresponding to the actual location of the person or object to be located.

12. The ultrasonic tracking and locating system as recited in claim 1, wherein said first transceiver means is coupled to said generating means and said indicating means by a plurality of telephone wires.

13. The ultrasonic tracking and locating system as recited in claim 1, wherein said first transceiver means and said generating means are coupled together by 115 volt 60 cycle transmission wires, and further comprising a carrier current transmission means coupled to said generating means for transmitting said sequence of digital pulses over said wires to said first transceiver means, said transceiver means being coupled to wall outlet receptacles for receiving digital pulses generated by said generating means.

14. The ultrasonic tracking and locating system as recited in claim 1 further comprising means for activating said generating means and said first and second transceiver means continuously in successive cycles, said indicating means operating in synchronization with said generating means and said first and second transceiver means, for automatically providing in successive cycles the location of the person or object desired.

15. The ultrasonic tracking and locating system as recited in claim 1 further comprising;
   a plurality of telephone extensions coupled to said generating means,
   means coupled to said telephone extensions for activating said generating means in response to the dialing of the identification number of a person or object to be located, and
   means for automatically connecting the telephone line on which said identification number is dialed to a telephone located near said first transceiver means generating said digital pulse and ringing said telephone.

16. The ultrasonic tracking and locating system as recited in claim 1 further comprising;
   at least one remote first transceiver means coupled to said generating means for generating a plurality of digitally coded ultrasonic signals in a location remote from said generating means, and
   a digital encoder coupled to said remote first transceiver means for receiving a single digital pulse transmitted by said remote first transceiver means in response to a second transceiver means located in said remote location, converting said pulse to a digital serial pulse train, and transmitting said pulse train to said indicating means and thereby providing an indication of the remote location of the person or object desired.

17. The ultrasonic tracking and locating system as recited in claim 16, wherein said encoder and said remote first transceiver means are coupled to said indicating means and said generating means by telephone wires.

18. The ultrasonic tracking and locating system as recited in claim 1 further comprising;
   RF transmission and receiving means for transmitting said coded pulses generated by said generating means and for receiving radio coded signals from remote locations,
   at least one remote first transceiver means for generating said plurality of coded pulses in a remote location,
   remote receiving means for receiving the RF transmission of said pulses generated by said generating means,
   a remote pulser coupled to said remote RF receiving means for relaying said received sequence of pulses to said remote transceiver means,
   a remote digital encoder for converting a single pulse response transmitted from said remote first transceiver means into a digital serial pulse train, and
   remote RF transmission means for transmitting said pulse train to said indicating means and thereby providing an indication of the location of the person or object desired.

19. The ultrasonic tracking and locating system as recited in claim 1 further comprising;
   RF transmission means and receiving means for transmitting said coded pulses generated by said generating means and receiving radio coded signals from a remote location,
   at least one remote first transceiver means for generating said plurality of digitally coded ultrasonic signals in the remote location,
   remote RF receiving means for receiving said radio coded signals from said RF receiving and transmission means,
   remote generating means and indicating means for generating said plurality of coded digital pulses and providing an indication of the location of the person or object desired,
   a TV camera focused on said indicating means provided on said remote console, for converting said indication of the location of the person or object desired into an electrical signal, and
   remote RF transmission means coupled to said TV camera for transmitting said electrical signals to said indicating means, so that said indicating means indicates the remote location of the person or object to be located.

20. The ultrasonic tracking and locating system as recited in claim 1 further comprising;
   at least one remote first transceiver means coupled to said generating means for generating a plurality of said digital ultrasonic signals in a remote location,
   remote generating and indicating means coupled to said first transceiver means for generating said digital coded pulses and providing an indication of the location of the person or object to be located at the remote location,
   a closed circuit TV camera focused on said remote indicating means for converting said indication of the remote location of the person or object to be located an electrical signal, and
   a closed circuit TV receiver coupled to said TV camera for receiving said electrical signals generated by said camera and transmitting said signals to said indicating means and thereby providing an indication of the remote location of the person or object to be located.

21. The ultrasonic tracking and locating system as recited in claim 20, wherein said remote first transceiver means and said closed circuit TV camera are coupled to said generating means and said closed circuit TV receiver respectively by a plurality of telephone wires.

* * * * *